United States Patent
Das et al.

(10) Patent No.: US 7,809,002 B2
(45) Date of Patent: Oct. 5, 2010

(54) METHOD AND APPARATUS FOR PRIORITY SERVICES MANAGEMENT

(75) Inventors: Kamala Prasad Das, Manalapan, NJ (US); Ajay Sathyanath, Woodbridge, NJ (US); Yung-Terng Wang, Marlboro, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 690 days.

(21) Appl. No.: 11/735,687

(22) Filed: Apr. 16, 2007

(65) Prior Publication Data

US 2008/0253390 A1  Oct. 16, 2008

(51) Int. Cl.
*H04L 12/56* (2006.01)
*H04L 12/26* (2006.01)

(52) U.S. Cl. .................. 370/395.42; 370/231; 370/235

(58) Field of Classification Search ..............................
370/395.21–395.43, 493–495; 455/432.1–435.3, 455/450–452.2, 507–513
See application file for complete search history.

(56) References Cited

U.S. PATENT DOCUMENTS

| | | | |
|---|---|---|---|
| 6,748,443 B1 * | 6/2004 | Parry et al. ................. | 709/232 |
| 2008/0139166 A1 * | 6/2008 | Agarwal et al. .......... | 455/404.1 |
| 2008/0144615 A1 * | 6/2008 | Casey ......................... | 370/389 |
| 2008/0162637 A1 * | 7/2008 | Adamczyk et al. .......... | 709/204 |
| 2008/0176582 A1 * | 7/2008 | Ghai et al. ................ | 455/456.2 |
| 2008/0298353 A1 * | 12/2008 | Zhu et al. .................. | 370/356 |
| 2009/0129388 A1 * | 5/2009 | Akhtar et al. ............... | 370/392 |

FOREIGN PATENT DOCUMENTS

| | | |
|---|---|---|
| CN | 1 832 447 A | 9/2006 |
| EP | 1 777 896 | 4/2007 |

OTHER PUBLICATIONS

PCT Search Report and Written Opinion in PCT/US2008/00548, Lucent Technologies Inc., Applicant, dated Nov. 5, 2008, 16 pages.
Tromparent M-M: "Communication protocol for interdomain resource reservation" Proceedings of the SPIE—The International Society for Optial Engineering, SPIE, Bellingham, VA; US, vol. 3126, Aug. 1, 2004, pp. 255-266, XP002437974.
"Telecommunications and Internet converged Services and Protocols for Advanced Networking (TISPAN); Resource and Admission Control; Protocol for QoS reservation information exchange between the Service Policy Decision Function (SPDF) and the Access-Resource and Admission Control Function (A-RACF) in" ETSI Standards, Lis, Sophia Antipolis Cedex, France, vol. TISPAN, No. V1.2.1, Feb. 1, 2007, XP014037297 ISSN: 0000-0001.
"Telecommunications and Internet Converged Services and Protocols for Advanced Networking (TISPAN); Resource and Admission Control Sub-system (RACS); Functional Architecture; Release 2; draft ETSI ES 282 0003" ETSI Standards, Lis, Sophia Antipolis Cedex, France, vol. TISPAN, No. V0.2.2, Oct. 1, 2006, XP014035972 ISSN: 0000-0001.

* cited by examiner

*Primary Examiner*—Thai D Hoang
(74) *Attorney, Agent, or Firm*—Wall & Tong, LLP

(57) ABSTRACT

Apparatus and method for adapting a control plane of a communications network normally using a call session control function (CSCF) in communication with a resource access control function (RACF) by providing a priority service functional element (PS-FE) to handle call admission and priority services.

19 Claims, 6 Drawing Sheets

100

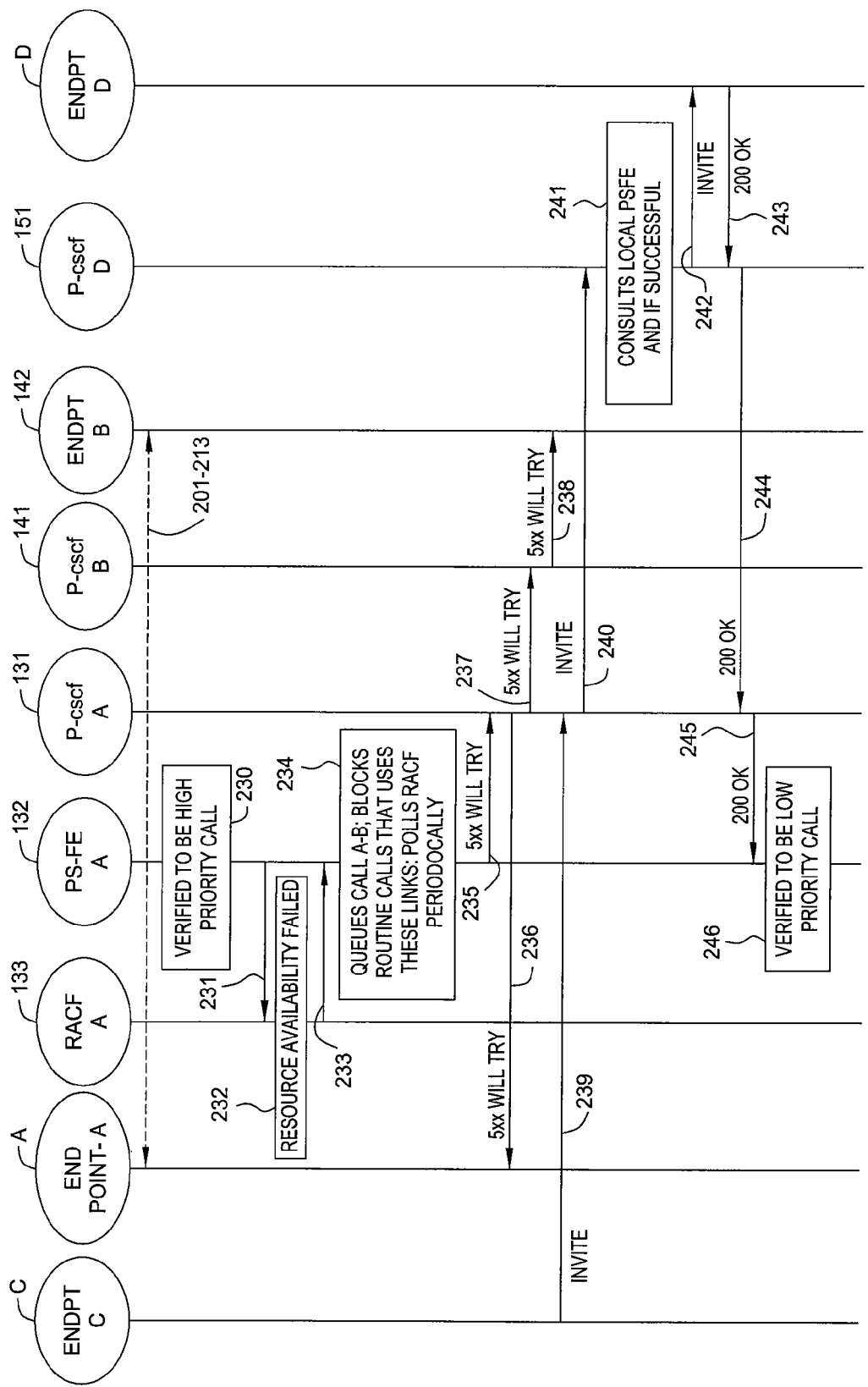

METHOD AND APPARATUS FOR PRIORITY SERVICES MANAGEMENT

FIELD OF THE INVENTION

The invention relates to the field of communications systems and, more specifically, to a resource control and policy-based management mechanism adapted to implement priority services.

DESCRIPTION OF THE BACKGROUND ART

Priority services is the name given to preferred treatment of certain kinds of traffic (e.g., media/data and signaling) over other kinds of traffic in, for example, the context of civilian or defense communications networks.

Priority in a public switched telephone network (PSTN) is performed on a switch by switch basis. Calls for priority users such as governments pass through the switches while non-priority traffic is blocked.

Three kinds of priority services exist at present; namely, wireless priority service (WPS), Government emergency telecommunications service (GETS) by national communications system (NCS) and multi-level precedents preemption (MLPP) by the United States Department of Defense (DOD).

GETS provides an ability to preempt calls at a lower priority than MLPP. GETS also provides for buffer-type queuing of a call such that the call will be the first call to pass when a necessary resource becomes available. Call control functionality includes the decision of choosing which call to allow and which call to preempt. Resource control and policy-based management functionality includes the decision of when to preempt a call or when to buffer-type queue a call.

Within the context of voice, video and other data communications (e.g., multimedia communications and the like) via packet based networks (e.g., Ethernet, etc.) there is presently no preemption or priority handling of voice calls or multimedia services.

SUMMARY OF THE INVENTION

Various disadvantages heretofore associated with the prior art are addressed by a novel network element, apparatus and method for combining call admission control and priority services within different types of networks.

A method according to one embodiment of the invention is adapted for use in a communications network including a call session control function (CSCF) in communication with a resource access control function (RACF). The method includes verifying a priority level of intended communications; receiving resource availability information from the RACF; propagating resource availability information to the CSCF; storing call admission information and resource allocation information; and in the event of a verified low priority communication having associated with it a resource insufficiency, communicating a resource unavailable message to the CSCF.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
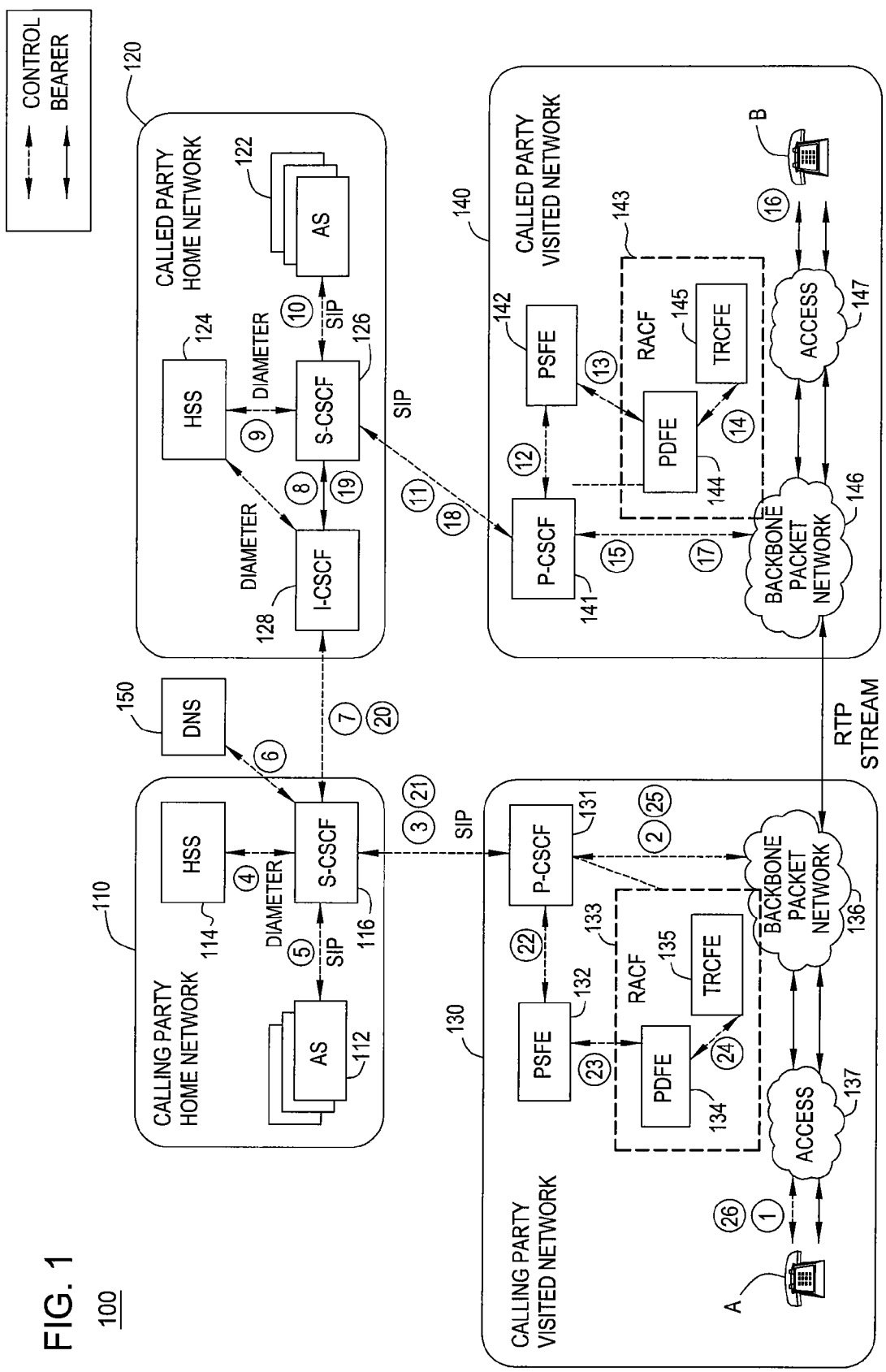
FIG. 1 depicts a network topology facilitating calls through various networks according to an embodiment of the invention.

The subject invention will be primarily described within the context of voice calls. However, since the subject invention is directed to the broader issues of multimedia services (including voice calls), references to calls and/or communications within this specification should be broadly construed to include voice, video, audio, email and other multimedia communications.

The subject invention enables the establishment and management of VoIP traffic of different priority levels in a network (for example an Internet Protocol (IP) network) by monitoring criteria indicative of importance of a new voice call entering the network, network capability and/or instantaneous load. Accordingly, an exemplary telecommunications system is described as one potential environment in which a subject invention operates and exists.

Generally speaking, the invention assists in enabling the following system and network characteristics: (1) A profitable uniform architecture that addresses the requirements for both DoD and NCS; (2) A minimization in the overlap of functionality in terms of development and maintenance of priority service features; (3) A minimization of the impact on existing architectures; (4) Addressing the requirements of IMS as well as non-IMS environments; (5) An ability to add on priority service at any time by a network provider; (6) An interoperability with network solutions of multiple vendors; (7) An ability to pass priority calls earlier than routine calls, when a congestion has been cleared and ability to maintain "current gets/wps voice functionality," which may require an ability to mimic priority signal queuing from a TDM environment; (8) An adaptation to IMS and non-IMS based Next Generation networks; (9) An ability to extend and support, at least architecturally, multimedia applications and mid-call features for priority services in the future; and (10) the providing of call admission control.

The present invention provides for a logical functional entity denoted as a priority services functional element (PS-FE) that integrates with both IMS and non-IMS networks. Within the context of network architectures adapted to utilize a PS-FE, the PS-FE is added to the architecture as an additional logical entity, such that the rest of the network architecture remains substantially unmodified. The PS-FE interacts with session initiation protocol (SIP) proxies, call session control functions (P-CSCF), resource access control facilities (RACF), (NGSP) and other PS-FE entities.

It is noted that the PS-FE can also perform its intended function without the use of a RACF. In this instance, control of specific links is achieved via accounting based methods (whereas control of an entire network is performed with a RACF). The functionality of conditional control is the focus, rather than the particular implementation of a RACF or accounting.

In one embodiment, a standard or commercial network architecture is modified to use a PS-FE by providers seeking NCS compliance, though mandatory use of PS-FE is envisioned for DOD networks. Optionally, PS-FE interaction with H323 systems is provided. The invention may be utilized within the context of SIP, H323, voice over IP (VoIP) or, more generally, X over IP network (XoIP), where X is a voice, video or multimedia communication.

The PS-FE provides priority signal message queuing (queuing tracked by links of a transport path) and preemption capabilities (i.e., it is able to identify the calls that need to be preempted to decongest certain links). Queuing in this context refers to the buffering-type queuing as known in the prior art. Queuing in the inventive context is termed by the inventor as protocol level queuing and includes buffering-type queuing as well as call state queuing. Queuing a call or other service occurs when, for example, a priority call cannot be cleared or connected due to resource unavailability. In this case the call is not dropped; rather, its state is stored by the PS-FE until appropriate resources become available. Being held or stored means that the state information of the call is stored for subsequent use. The state of a call comprises the call source, the call destination, the resources needed to support the call so on.

Call admission control in a simple form is defined as determining which calls should be dropped and which calls should be allowed. Priority services in a simple form is defined as providing preferential treatment to some calls and not other calls. To effectively perform call admission control and priority services, the network needs to have knowledge of the calls in the system, their actual call paths (control plane and media plane paths) as well as the transport resources available in the network. One aspect of the invention is an improvement in the art by including, within one entity (the PS-FE), priority and call information (e.g., number of calls in system, available transport resources and the like) needed to combine and control call admission and priority service functions. Thus, the PS-FE helps to simplify network control plane architecture by combining multiple priority-related functions (e.g., call admission control and priority services) in a single functional entity)

The PS-FE optionally communicates via Diameter to a RACF. The PS-FE is call-state aware such that it can identify calls over links in the transport network (transport resource aware).

In some embodiments the PS-FE continuously polls a RACF to identify availability of resource such that resource clearance of multiple call paths may be handled efficiently. In some embodiments the PS-FE operates without a RACF (e.g., for open loop or accounting based controls).

In some embodiments, additional support for the PS-FE is beneficial. Specifically, at times is appropriate for a RACF to pass link information of a media path (e.g., via a PDFE) to the PS-FE. However, this will be needed only under certain cases. RACF link information is not needed when a call flows or when a priority call is cleared. For a priority call not cleared by the RACF, link information is needed for all subsequent RACF-cleared calls so that availability of resources supporting the non-cleared priority call can be determined.

Optionally, a P-CSCF (or a Proxy in non-IMS cases) will pass every SIP message it receives to the PS-FE. Optionally, a new 5xx message to convey network attempts (e.g., in the case of priority call queuing) is appropriate. Optionally, a protocol between the PS-FE and NGSPs may be adapted to address fault tolerance issues such that fault tolerance functionality need not be distributed across a number of CSCFs.

FIG. 1 depicts a network topology facilitating calls through various networks according to an embodiment of the invention. Specifically, FIG. 1 depicts an exemplary communications system 100 according to an embodiment of the invention. In addition to architecture, FIG. 1 also depicts control and bearer signal paths, which signal paths are associated with reference numerals indicative of a temporal order of utilization in establishing and tearing down calls. FIG. 1 will be discussed in conjunction with other FIG. to illustrate various call flow examples according to embodiments of the present invention.

Specifically, FIG. 1 depicts a plurality of networks including a calling party home network 110, a called party home network 120, a calling party visited network 130 and a called party visited network 140.

The calling party home network 110 comprises one or more AS modules 112, a home subscriber server (HSS) 114 and a serving call session control function (S-CSCF) 116.

The called party home network 120 comprises one or more application servers (AS) 122, a home subscriber server (HSS) 124, a serving call session control function (S-CSCF) 116 and interrogating call session control function (I-CSCF) 128.

The calling party visited network 130 comprises a P-CSCF 131, a priority services functional element (PS-FE) 132, a resource allocation control function (RACF) 133, a backbone packet network 136 and an access network 137. The RACF 133 includes a policy decision functional element (PD-FE) 134 and a traffic resource control functional element (TRC-FE) 135.

The called party visited network 140 comprises a P-CSCF 141, a priority services functional element (PS-FE) 142, a resource allocation control function (RACF) 143, a backbone packet network 146 and an access network 147. The RACF 143 includes a policy decision functional element (PD-FE) 144 and a traffic resource control functional element (TRC-FE) 145.

The network 100 FIG. 1 may be modified to represent a conventional network by removing each PS-FE and RACF from the calling and called party visited networks. In this case, a call between A and B is initiated in accordance with the numbered signal paths 1-16; namely (1) a call invitation is communicated from endpoint A via access network 137 to backbone packet networks 136, then (2) to P-CSCF 131 and then to (3) S-CSCF, which (4) queries HSS 114, (5) AS 112 and (6) DNS 150 to retrieve the appropriate information pertaining to the called party and its home network. S-CSCF 116 then (7) communicates with the I-CSCF 128 of the called party home network. I-CSCF 128 propagates the request (8) to S-CSCF 126, which communicates (9) with its local HSS 124 and (10) AS 122 together necessary information regarding endpoint B. S-CSCF then (11) propagates a message to the P-CSCF 141 of the called party visited network 140 associated with endpoint B.

The above steps (1-11) are fairly conventional. In a conventional network, the P-CSCF 141 communicates via a backbone packet network 146 to identify those router and other output ports within the RTP stream capable of supporting the call. This information is propagated back to the P-CSCF 131. The P-CSCF 131 and P-CSCF 141 cause their respective backbone packet networks 136 and 137 provide a communication path supporting the call within the RTP stream.

The remaining steps (12-26) includes steps adapted in conformance to the present invention. Specifically, the network 100 of FIG. 1 is depicted as including a PS-FE and RACF within each of the calling and called party visited networks. The interaction of these components with each other and existing infrastructure will be described in more detail below with respect to the remaining figures.

Within the context of the present invention, a SIP Proxy (or P-CSCF or H323 gatekeeper, depending on the topology used) continues to work as a transaction-stateful or call-stateless proxy as regards all other features. All calls, independent of priority, to or from a SIP Proxy (or P-CSCF or H323 gatekeeper) are locally looped to a PS-FE. The PS-FE optionally maintains call-state information (including link identification information for the traversed links associated with the call) for only priority calls. Communications between PS-FE and RACF are via diameter for necessary resource clearance and various demands necessary transport path information (e.g., if and only if there is a priority call that is queued). Advantageously, the PS-FE obtains all necessary resource clearance for a particular call in one operation. The PS-FE performs necessary signal message queuing when it decides that a priority call cannot be let through. The PS-FE routinely polls the RACF to identify resource availability for queued calls (priority). The PS-FE sends back appropriate (standard SIP) error messages to the SIP Proxy (or CSCF) to signal a call that is to be blocked, if need be. The PS-FE sends back appropriate (standard) SIP protocol messages to the SIP Proxy (or CSCF) to signal a call that is to be allowed. The PS-FE initiates 3rd party calling for queued priority calls via the P-CSCF, as and when the resources for those calls become available. In the case of a $3^{rd}$ party call, the network operates to communicate (i.e., call back) both the calling party and the called party at a later time.

While denoted as a realtime transport protocol (RTP) stream in FIG. 1, the backbone packet networks may communicate via any streaming protocol, such as transmission control protocol (TCP), user datagram protocol (UDP) and the like.

Figure 2A:
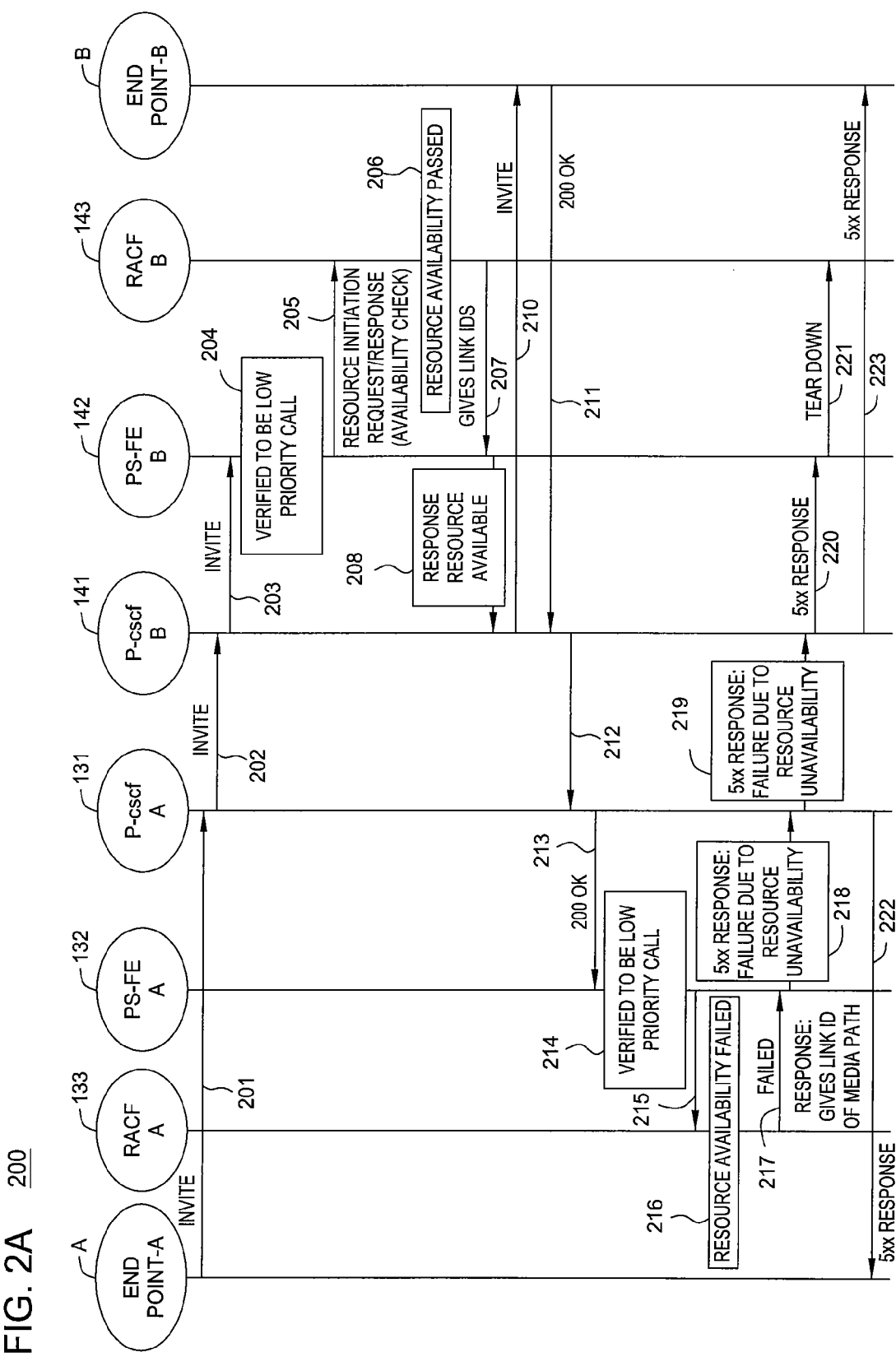
FIG. 2 depicts a flow diagram of routines according to embodiments of the present invention.
Figure 2C:
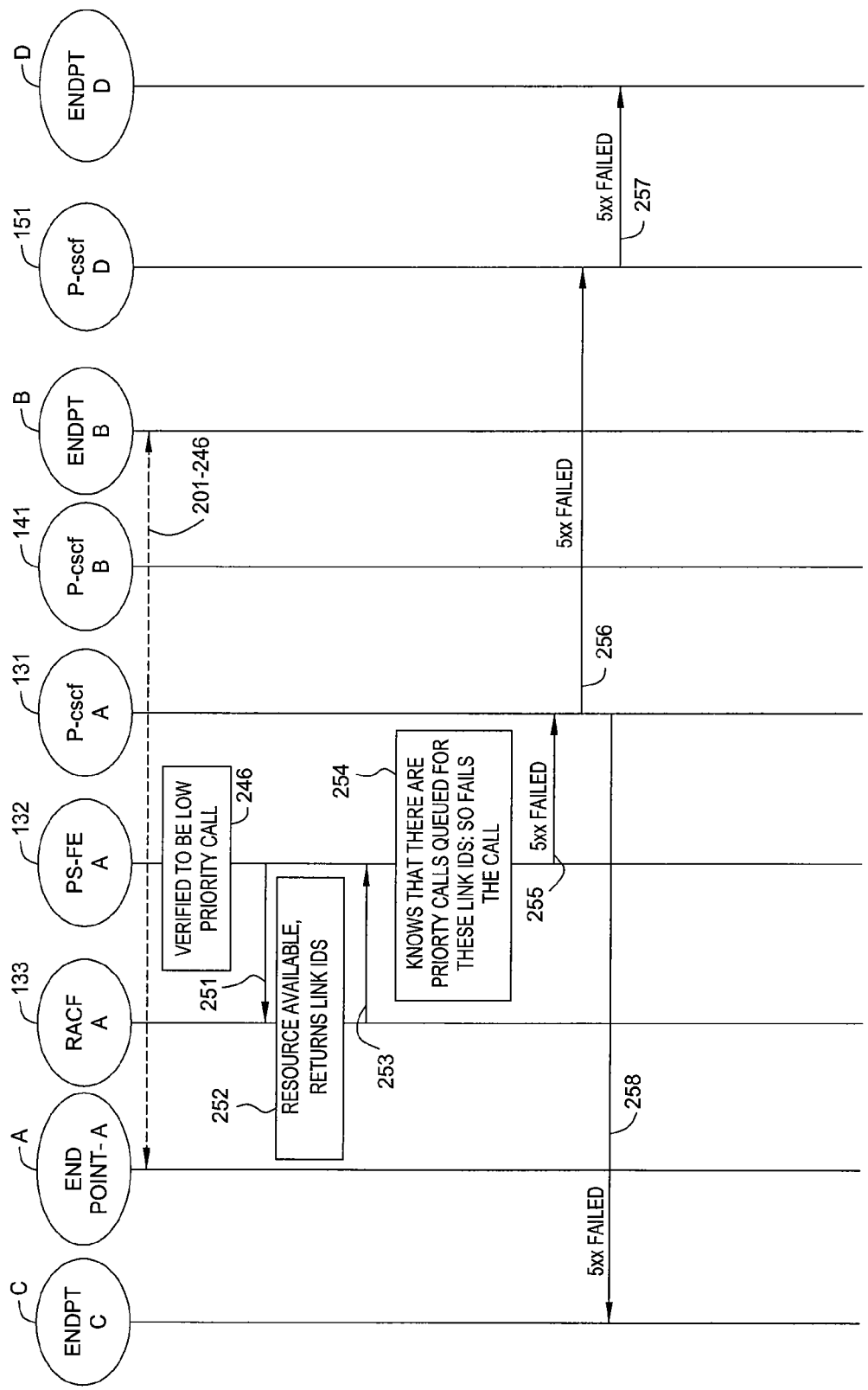
Figure 2D:
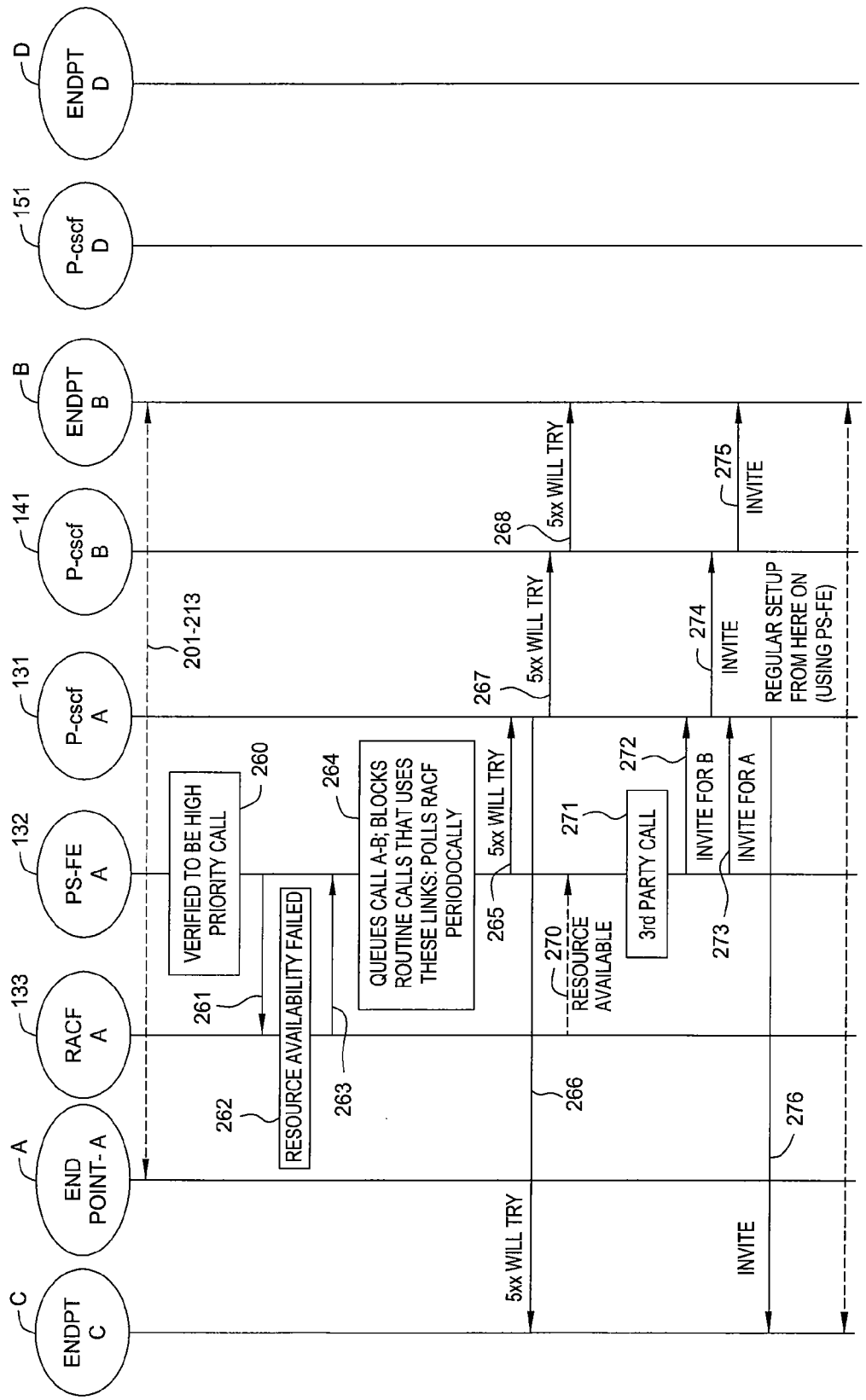

FIG. 2 depicts a flow diagram of routines according to embodiments of the present invention. Call blocking and call flow within the context of NCS services will now be described more detail with respect to FIG. 2, which comprises FIGS. 2A-2D. FIG. 2A graphically depicts call blocking call flow between a first endpoint A and a second endpoint B. FIGS. 2B and 2C graphically depict call blocking call flow between the first endpoint A, second endpoint B, a third endpoint C and a fourth endpoint D. FIG. 2D graphically depicts priority call queuing and subsequent call creation the first endpoint A, second endpoint B, third endpoint C and fourth endpoint D.

The call blocking call flow, call queuing and call creation of 200 of FIG. 2 will be described within the context of the communications system 100 of FIG. 1. Specifically, control signal paths between endpoint A of calling party visited network 130 and endpoint B of called party visited network 140 as depicted in FIG. 2 comprise, in the order named, RACF 133, PS-FE 132, P-CSCF 131, P-CSCF 141, PS-FE 142 and RACF 143.

FIG. 2A graphically depicts call blocking call flow between a first endpoint A and a second endpoint B. Referring now to FIG. 2A, an invite message is propagated from endpoint A to P-CSCF 131 (step 201), then to P-CSCF 141 (step 202), and finally to PS-FE 142 (step 203). PS-FE 142 verifies that the invited call comprises a low priority call (step 204) and propagates a resource initiation request/response (i.e., and availability check) to RACF 143 (step 205). RACF 143 determines that resources are available (step 206) and provides the resource link identifications to PS-FE 142 (step 207), which propagates the link IDs to P-CSCF 141 wherein resource available response is formulated (step 208). P-CSCF 141 propagates an invite message to endpoint B (step 210), which returns a "200 OK" acceptance message (step 211). The acceptance message is propagated by P-CSCF 141 to P-CSCF 131 (step 212) and PS-FE 132 (step 213).

The above-described portion of the method 200 of FIG. 2 (i.e., steps 201 through 213) depicts the various steps associated with call invitation and resource allocation for a low priority call between endpoint A and endpoint B. Call invitation and resource allocation for a high priority call is conducted in substantially the same manner up to this point, as will be described in more detail below.

Returning to FIG. 2A, PS-FE 132 is depicted as verifying the call to be a low priority call (step 214), and propagating this priority information to RACF 133. RACF 133 is depicted as determining that a resource availability has failed (step 216) and propagating a failed resource and availability response including link identification of the relevant media path to PS-FE 132 (step 217). PS-FE 132 propagates a 5XX response of "failure due to resource on availability" to P-CSCF 131 (step 218), which forwards the 5XX response to P-CSCF 141 (step 219) and endpoint A (step 222). P-CSCF 141 forwards the 5XX response to PS-FE 142 (step 220) and endpoint B (step 223). PS-FE 142 propagates a tear down message to RACF 143 (step 221) in response to the 5XX failure due to resource on availability message.

The above-described portion of the method 200 of FIG. 2 (i.e., steps 214 through 223) depicts the various steps associated with an orderly tear down of a low priority call in response to a failure of resource availability.

Thus, within the context of NCS services, the method 200 of FIG. 2 depicts, for each of two endpoints, respective PS-FE elements (132 and 142) in communication with corresponding RACF and P-CSCF elements to provide an orderly tear down of a low priority call in response to a failure of resource availability.

FIGS. 2B and 2C graphically depict call blocking call flow with respect to a first call between the first endpoint A and second endpoint B, and a second call between third endpoint C and fourth endpoint D. It is noted that the third endpoint C and a fourth endpoint D are not explicitly shown in FIG. 1. However, the third endpoint C is included within a calling party visited network 160 (not shown) comprising substantially the same elements as calling party visited network 130, and fourth endpoint D is included within a called party visited network 170 (not shown) comprising substantially the same elements as called party visited network 140. That is, visited networks 160 and 170 each include a respective P-CSCF, PS-FE, RACF, backbone packet network and access network. Moreover, visited networks 160 and 170 each communicate with other networks in substantially the same manner as described above with respect to visited networks 130 and 140. Alternatively, one or both of the third endpoint C and a fourth endpoint D may be associated with the calling party visited network 130 and/or called party visited network 140.

Referring now to FIG. 2B, steps 201-213 are performed in substantially the same manner as described above with respect to FIG. 2A such that a call invitation and resource allocation for a low priority call between endpoint A and endpoint B is provided. However, in this embodiment, the PS-FE 132 is depicted as verifying the call to be a high priority call (step 2230), and propagating this priority information to RACF 133. RACF 133 is depicted as determining that a resource availability has failed (step 232) and propagating a failed resource and availability response including link identification of the relevant media path to PS-FE 132 (step 233). PS-FE 132 then queues call A-B, blocks routine calls that use the links associated with call A-B and, optionally, begins pulling RACF 133 two update resource availability and current call state (step 234). In addition, PS-FE 132 propagates a 5XX response of "will try" to P-CSCF 131 (step 235), which forwards the 5XX response to P-CSCF 141 (step 237) and endpoint A (step 236). P-CSCF 141 forwards the 5XX response to endpoint B (step 238).

The above-described portion of the method 200 of FIG. 2 (i.e., steps 230 through 238) depicts the various steps associated with queuing a high priority call (e.g., A-B) and blocking low priority calls (e.g., C-D) associated with the high priority call links.

After queuing the high priority A-B call, PS-FE 132 periodically polls RACF 133 (step 234) to determine when the resources needed to support the high protocol become available. In one embodiment this polling is conducted on a periodic basis, such as every minute, 30 seconds, 10 seconds and the like. Longer or shorter time periods may be employed. In an alternate embodiment, this polling is conducted in conjunction with other communications between the PS-FE 132 and RACF 133. For example, each communication between the PS-FE 132 and RACF 133 (e.g., to make inquiries regarding other calls and the like) may have piggybacked upon it a polling request associated with one or more queue high priority calls. In this manner, control path bandwidth and signaling overload/complexity may be reduced. In one embodiment, such polling occurs at a predetermined rate and/or during each PS-FE to RACF communication.

Within the context of the present invention, a low priority call is blocked where any of the links needed to support that call are also needed to support a high priority call. Thus, even if only one link below protocol is associated with links supporting a high-priority call, the low priority call is blocked. In one embodiment, additional processing is provided to determine whether communication paths supported by the one or more links associated with both low and high priority calls may be alternatively supported by other links.

Returning to FIG. 2B, an invite message is propagated from endpoint C to P-CSCF 131 (step 239), then to P-CSCF 151 (step 240). P-CSCF 151 consults its local PS-FE 152 and, if PS-FE 152 verifies that the invited call comprises a low priority call (step 241), propagates an invite message to endpoint D (step 242), which returns a "200 OK" acceptance message (step 243). The acceptance message is propagated by P-CSCF 151 to P-CSCF 131 (step 244) and then to PS-FE 132 (step 245), where the call is verified to be a low priority call (step 246). Referring now to FIG. 2C, after verifying that the call is a low priority call, the PS-FE 132 propagates the verification message to the RACF 133 (step 251), which determines (step 252) if the necessary resources are available and responsibly returns (step 253) link identification information to the PS-FE 132. However, where the link identification information for the low priority call is associated with the link identification information for a queue high priority call, the PS-FE 132 sales a low priority call (step 254) and propagates a 5XX "failed" message to the P-CSCF 131 (step 255). The P-CSCF 131 propagates the 5XX message to the P-CSCF 151 (step 256) and third endpoint C (step 258). P-CSCF 151 propagates the 5XX message to fourth endpoint D.

The above-described portion of the method 200 of FIG. 2B (i.e., steps 239 through 246) depicts the various steps associated with call invitation and resource allocation for a low priority call between endpoint C and endpoint D where the call has failed due to a pre-existing queue high priority call that will require the same communication links/resources.

FIG. 2D graphically depicts priority call queuing and subsequent call creation with respect to a first call between the first endpoint A and second endpoint B, and a second call between third endpoint C and fourth endpoint D. Steps 201-213 are performed in substantially the same manner as described above with respect to FIG. 2A such that a call invitation and resource allocation for a high priority call between endpoint A and endpoint B is provided. The next steps 260-268 of FIG. 2D substantially conform to the previously described steps 230-238 of FIG. 2B to depict thereby the various steps associated with queuing the A-B high priority call and blocking low priority calls (such as C-D) associated with the high priority call links.

Upon the resources necessary for a high-priority call becoming available, a message is propagated from the RACF 133 to the PS-FE 132 (step 270). This message may be a response message from a polling operation where the RACF is not "PS-FE-aware." Alternatively, if the RACF is a "PS-FE-aware" device, each time the RACF determines that resources supporting one or more priority calls become available it also propagates any "resource available" message to the relevant PS-FE or PS-FEs. It is noted that this description of step 270 in FIG. 2D is applicable to RACF polling and/or resource management operations discussed elsewhere within the specification.

Upon receiving the resource available message, PS-FE 132 initiates a third-party call procedure (step 271). PS-FE 132 propagates to P-CSCF 131 call invitations for endpoint B (272) and endpoint A (step 273). In response, P-CSCF 131 propagates the call invitations to endpoint B (step 275) and endpoint A (step 276). The remainder of the A-B call set up is then conducted substantially as previously described (e.g., per steps 201-213).

The above-described portion of the method 200 of FIG. 2D (i.e., steps 270 through 277) depict the various steps associated with call invitation and resource allocation for a high priority call between endpoint A and endpoint B where the call has been queued due to a resource availability failure.

Figure 3:
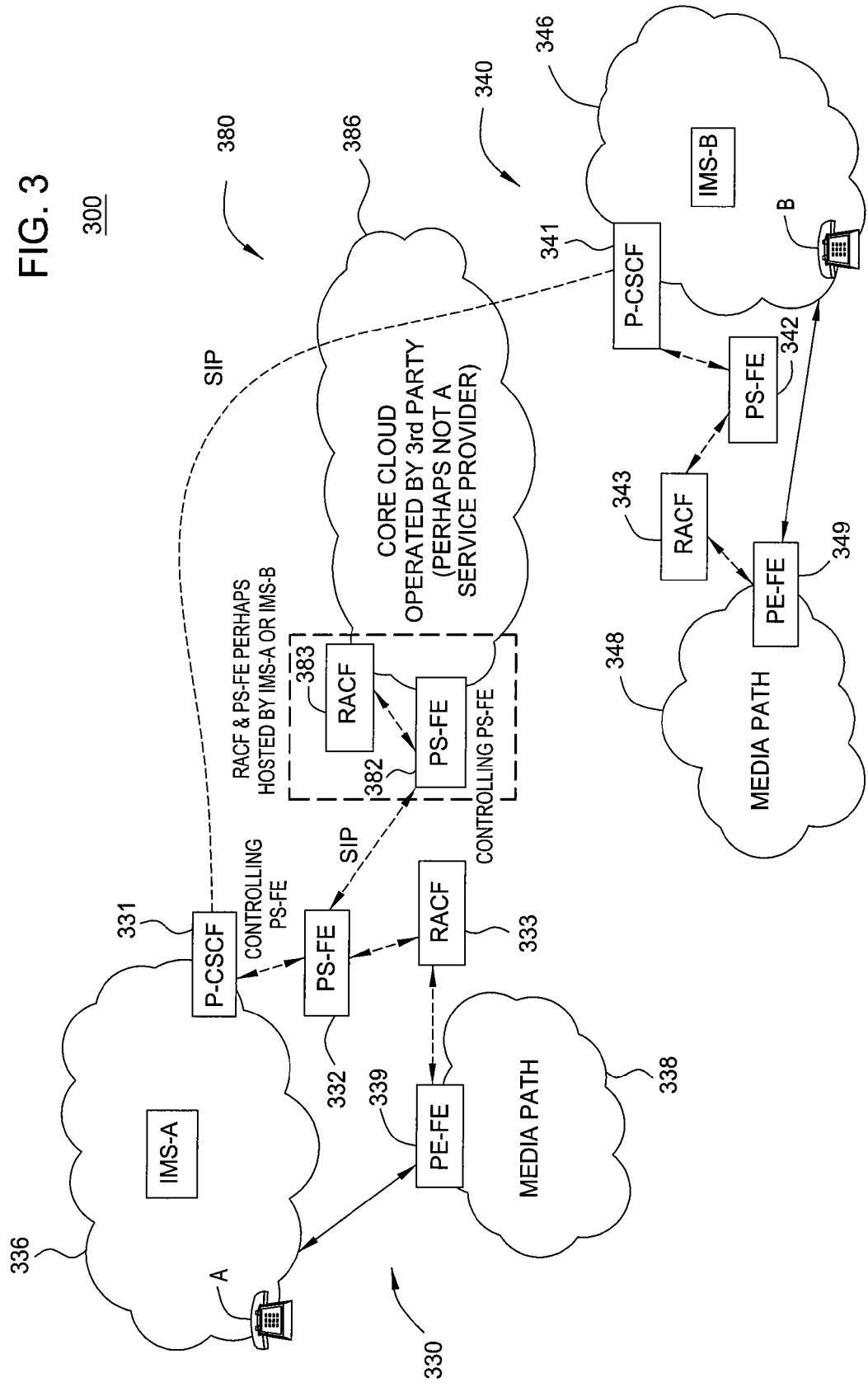
FIG. 3 depicts a network topology facilitating calls through core networks according to an embodiment of the invention.

FIG. 3 graphically depicts a network topology facilitating calls through core networks according to an embodiment of the invention. Specifically, a first IMS network 330 communicates with a second IMS network 340 via a core network 380. The first and second IMS networks may be from the same or different service providers were the only connection between the first and second IMS networks is via core network, such as the Internet or a third-party provider.

First IMS network 330 comprises a P-CSCF 331 a communication with a first endpoint A via a packet network 336. The P-CSCF 331 communicates with a PS-FE 332, which communicates with a RACF 333. The RACF 333 and endpoint A communicate with a policy enforcement functional element (PEFE) 339, which is associated with a media path 338.

Second IMS network 330 comprises a P-CSCF 341 a communication with a second endpoint B via a packet network 346. The P-CSCF 341 communicates with a PS-FE 342, which communicates with a RACF 343. The RACF 343 and endpoint A communicate with a policy enforcement functional element (PEFE) 349, which is associated with a media path 348.

Coupled between the first 330 and second 340 IMS networks is a core network 380 comprising a core network "cloud" 386 such as a third-party or generic Internet cloud. The core cloud is associated with a RACF 383 and PS-FE 382, both of which communicate with each other.

The PS-FE 382 is depicted as communicating with PS-FE 332 via a SIP communications channel. Similarly, the P-CSCF 331 is depicted as communicating with P-CSCF 341 via a SIP communications channel.

Within the context of the present invention, a call between the first and second endpoint is set up in a manner similar to that described above with respect to FIG. 2. However, the PS-FE 382 is used to identify available resources within the core cloud such that priority calls may be queued and non-priority calls may be preempted as needed. Such queuing and preemption are performed using any of the techniques described above with respect to FIG. 2. Briefly, if any one link within a priority call path is associated with a non-priority call, the non-priority call is dropped. Upon resources becoming available (e.g., as indicated by PS-FE polling of RACF 383), queued priority calls are established (e.g., two party, third-party and the like).

The PS-FE of the present invention advantageously isolated Priority Services development so that such services are easier to develop and maintain. Moreover, such services may now be provided without service and software replication with respect to vendor product offerings. Priority Services can be an optional service required by a customer and can fit IMS and non-IMS networks, including H323. With the novel PS-FE, newer DISA and NGPS features are easier to develop. In this manner, new features like "priority conference call reservation" of priority conferences may be implemented. In addition, the PS-FE relieves the burden of having a CSCF or any other fully operational SIP Proxy maintain resource awareness (i.e., call states with respect to the links). The PS-FE provides resource control and policy-based management mechanism adapted to implement priority services in a packet network environment, such as described herein.

The above-described embodiments of the invention may be implemented within the context of methods, computer readable media and computer program processes. Generally speaking, methods according to the invention may be implemented using computing devices having a processor as well as memory for storing various control programs, other programs and data. The memory may also store an operating system supporting the programs. The processor cooperates with conventional support circuitry such as power supplies, clock circuits, cache memory and the like as well as circuits that assist in executing the software routines stored in the memory. As such, it is contemplated that some of the steps discussed herein as software processes may be implemented within hardware, for example as circuitry that cooperates with the processor to perform various steps. Input/output (I/O) circuitry forms an interface between the various functional elements communicating with the device.

A computing device is contemplated as, illustratively, a general purpose computer that is programmed to perform various control functions in accordance with the present invention, the invention can be implemented in hardware as, for example, an application specific integrated circuit (ASIC) or field programmable gate array (FPGA). As such, the process steps described herein are intended to be broadly interpreted as being equivalently performed by software, hardware or a combination thereof.

The invention may also be implemented as a computer program product wherein computer instructions, when processed by a computer, adapt the operation of the computer such that the methods and/or techniques of the present invention are invoked or otherwise provided. Instructions for invoking the inventive methods may be stored in fixed or removable media, transmitted via a data stream in a signal bearing medium such as a broadcast medium, and/or stored within a working memory within a computing device operating according to the instructions.

While not specifically noted, it will be appreciated by those skilled in the art that various network management system (NMS) and element management system (EMS) are used to manage the various functional elements discussed herein, including the new PS-FE. Each PS-FE is managed by an appropriate NMS and/or EMS, which is selected according to the network within which the PS-FE operates. Thus, the PS-FE is operable to provide bridge and information and protocol bridge between various management systems such that call state aware and priority state aware information may be utilized throughout a large group of networks, as discussed above.

Within the context of a NMS or EMS utilizing the present invention, an instantiation of an application such as an IMS application includes a PS-FE that is logically and/or physically disposed between the RACF and CSCF of a network to perform the various functions discussed above. As such, one embodiment of the invention comprises a method for adapting a control plane of a communications network normally using a call session control function (CSCF) in communication with a resource access control function (RACF), where the method includes providing a priority service functional element (PS-FE) between each RACF and its corresponding CSCF to verify a priority level for each call, receive resource allocation information from the RACF, store a resource allocation for each call, and cause the CSCF to preferentially allocate resources to high priority calls as discussed above with respect to the various figures. Instantiations supporting the PS-FE may be provided on a single server or multiple servers, and/or within a single network or multiple networks.

An apparatus according to the invention is adapted for use in a system comprising a plurality of networks, each of which include a resource access control function (RACF), a call session control function (CSCF) and a packet network supporting, illustratively, a Realtime Transport Protocol (RTP) stream between the calling and called party networks, the apparatus includes at least one priority service functional element (PS-FE) in communication with a corresponding RACF and a corresponding CSCF, for verifying a priority level of intended communications, propagating corresponding resource availability information from the RACF to the CSCF, and storing resource allocation information, wherein in the event of a verified low priority communication having associated with it a resource insufficiency, the PS-FE communicates a resource unavailable message to the CSCF. In addition, in the event of a verified high priority communication having associated with it a resource insufficiency, the PS-FE queues the high priority communication and, optionally, propagates a corresponding 5xx message to the CSCF. The PS-FE may then periodically poll the RACF to determine if sufficient resources are available to support the verified high priority communication. Optionally, PS-FE reserves each of a plurality of resources supporting a queued high priority communication as each resource becomes available. Also, in the event of a verified low priority communication having associated with it a resource availability that includes a resource supporting a queued high priority communication, the PS-FE communicates a resource unavailable message to the CSCF. As sufficient resources become available to support a queued high priority communication, the PS-FE communicates a resource available message to the CSCF.

The PS-FE advantageously provides a knowledge of call-states as well as the "links" that they pass through, in order to block routine calls (both NCS and DoD), queue priority calls against the "links" that they will use (NCS) and tear down/preempt calls, under certain conditions, based on the "links" that they traverse (DoD). The PS-FE also provides an ability to perform 3rd party calling (network initiated) when queued calls are processed, and an ability to obtain "link" (i.e., transport resource paths) information from certain elements in the network. This information is then passed to the relevant management system.

Although various embodiments which incorporate the teachings of the present invention have been shown and described in detail herein, those skilled in the art can readily devise many other varied embodiments that still incorporate these teachings.

We claim:

1. An apparatus comprising:
   at least one priority service functional element (PS-FE) configured to communicate with a corresponding resource access control function (RACF) and a corresponding call session control function (CSCF), the PS-FE for verifying a priority level of an intended communication, propagating corresponding resource availability information from the corresponding RACF to the corresponding CSCF, and storing resource allocation information, wherein:

in the event of a verified low priority communication having associated with it a resource insufficiency, the PS-FE is configured to communicate a resource unavailable message to the corresponding CSCF;

in the event of a verified high priority communication having associated with it a resource insufficiency, the PS-FE is configured to queue the verified high priority communication.

2. The apparatus of claim 1, wherein the corresponding CSCF comprises a session initiation protocol (SIP) server.

3. The apparatus of claim 1, wherein the corresponding CSCF comprises a H323 gatekeeper.

4. The apparatus of claim 1, wherein the intended communication is an intended communication according to a streaming data protocol, wherein the streaming data protocol comprises one or more of a realtime transport protocol (RTP), a transmission control protocol (TCP) and a user datagram protocol (UDP).

5. The apparatus of claim 1, wherein:
in the event of the verified high priority communication having associated with it a resource insufficiency, the PS-FE is configured to propagate a corresponding 5xx message to the corresponding CSCF.

6. The apparatus of claim 5, wherein:
in the event of sufficient resources becoming available to support a queued high priority communication, the PS-FE is configured to communicate a resource available message to the corresponding CSCF.

7. The apparatus of claim 1, wherein:
the PS-FE is configured to periodically poll the corresponding RACF to determine if sufficient resources are available to support the verified high priority communication.

8. The apparatus of claim 7, wherein:
the PS-FE is configured to reserve each of a plurality of resources supporting a queued high priority communication as each resource becomes available.

9. The apparatus of claim 8, wherein:
in the event of a verified low priority communication having associated with it a resource availability that includes a resource supporting a queued high priority communication, the PS-FE is configured to communicate a resource unavailable message to the corresponding CSCF.

10. The apparatus of claim 1, wherein a respective PS-FE is disposed in each of a plurality of networks, each respective PS-FE for preferentially allocating resources to priority communications, the respective PS-FE in at least one network disposed between respective CSCF and RACF.

11. The apparatus of claim 1, wherein the PS-FE is configured to queue a communication by storing its call state information, the call state information including at least call source, call destination and required call resources.

12. The apparatus of claim 11, wherein a queued high priority communication is completed when resources become available or as part of a third party communication.

13. The apparatus of claim 1, wherein the PS-FE communicates with the corresponding RACF via Diameter.

14. The apparatus of claim 1, wherein a respective PS-FE is disposed in each of a plurality of networks, wherein at least one network does not include a RACF, and wherein the respective PS-FE of the at least one network supports at least one of an open loop control and an accounting based control.

15. The apparatus of claim 1, wherein the PS-FE is disposed in each of a plurality of networks, wherein at least one of the networks comprising an IP Multimedia System (IMS) network in which the PS-FE receives session initiation protocol (SIP) messages from the corresponding CSCF.

16. The apparatus of claim 1, wherein the PS-FE is disposed in each of a plurality of networks, wherein at least one of the networks comprises a SIP network, a H323 network or an XoIP network.

17. A method for adapting a control plane of a communications network normally using a call session control function (CSCF) in communication with a resource access control function (RACF), comprising:

providing a priority service functional element (PS-FE) between the RACF and the CSCF, the PS-FE including a processor to verify a priority level for each call, receive resource allocation information from the RACF, store a resource allocation for each call, and cause the CSCF to preferentially allocate resources to high priority calls, wherein:

in the event of a verified low priority communication having associated with it a resource insufficiency, the PS-FE is configured to communicate a resource unavailable message to the corresponding CSCF;

in the event of a verified high priority communication having associated with it a resource insufficiency, the PS-FE is configured to queue the verified high priority communication.

18. A method comprising:
verifying, using a processor, a priority level of an intended communication;
receiving resource availability information from a resource access control function (RACF);
propagating the resource availability information to a call session control function (CSCF);
storing call admission information and resource allocation information;
in the event of a verified low priority communication having associated with it a resource insufficiency, communicating a resource unavailable message to the CSCF; and
in the event of a verified high priority communication having associated with it a resource insufficiency, queuing the verified high priority communication.

19. A computer readable storage medium storing a program which, when executed, performs an operation of managing calls of different priority levels, the operation comprising:
verifying a priority level of an intended communication;
receiving resource availability information from a resource access control function (RACF);
propagating resource availability information to a call session control function (CSCF);
storing call admission information and resource allocation information;
in the event of a verified low priority communication having associated with it a resource insufficiency, communicating a resource unavailable message to the CSCF; and
in the event of a verified high priority communication having associated with it a resource insufficiency, queuing the verified high priority communication.

* * * * *